United States Patent
Mansell et al.

(10) Patent No.: US 8,332,515 B2
(45) Date of Patent: Dec. 11, 2012

(54) SYSTEM AND METHOD FOR SERVING WEB PAGES

(75) Inventors: Ben Ross Mansell, Cambridge (GB); Crispin Edward Harold Flowerday, Cambridge (GB)

(73) Assignee: Riverbed Technology, Inc., San Francisco, CA (US)

( * ) Notice: Subject to any disclaimer, the term of this patent is extended or adjusted under 35 U.S.C. 154(b) by 830 days.

(21) Appl. No.: 12/425,513

(22) Filed: Apr. 17, 2009

(65) Prior Publication Data
US 2009/0265766 A1 Oct. 22, 2009

(30) Foreign Application Priority Data
Apr. 17, 2008 (GB) .................................. 0807030.2

(51) Int. Cl.
*G06F 15/173* (2006.01)
*G06F 9/46* (2006.01)

(52) U.S. Cl. ........ 709/226; 709/203; 709/223; 709/224; 709/225; 709/227; 718/105

(58) Field of Classification Search .................. 709/203, 709/223–227; 718/105
See application file for complete search history.

(56) References Cited

U.S. PATENT DOCUMENTS

| | | | | |
|---|---|---|---|---|
| 5,774,660 | A * | 6/1998 | Brendel et al. ................ | 709/201 |
| 6,611,498 | B1 * | 8/2003 | Baker et al. .................... | 370/252 |
| 7,116,682 | B1 * | 10/2006 | Waclawsky et al. .......... | 370/468 |
| 7,131,137 | B1 * | 10/2006 | Jason et al. ....................... | 726/1 |
| 7,233,982 | B2 * | 6/2007 | Shenefiel ...................... | 709/219 |
| 7,523,178 | B2 * | 4/2009 | Reeves et al. ................ | 709/221 |
| 7,523,200 | B2 * | 4/2009 | Gross et al. ................... | 709/225 |
| 7,565,402 | B2 * | 7/2009 | Schneider ..................... | 709/203 |
| 7,581,006 | B1 * | 8/2009 | Lara et al. ..................... | 709/226 |
| 7,606,146 | B1 * | 10/2009 | Pan et al. ....................... | 370/229 |
| 7,765,312 | B2 * | 7/2010 | Monette et al. ............... | 709/229 |
| 7,774,470 | B1 * | 8/2010 | Sanders et al. ................ | 709/226 |
| 7,805,515 | B2 * | 9/2010 | Riley .............................. | 709/226 |
| 7,852,840 | B2 * | 12/2010 | Le Roux et al. .............. | 370/389 |
| 7,953,857 | B2 * | 5/2011 | Short et al. ..................... | 709/226 |
| 7,957,417 | B2 * | 6/2011 | McKinnon et al. ........... | 370/468 |
| 2003/0046396 | A1 * | 3/2003 | Richter et al. ................ | 709/226 |
| 2004/0088408 | A1 * | 5/2004 | Tsyganskiy ................... | 709/225 |
| 2005/0050334 | A1 * | 3/2005 | Liang et al. ................... | 713/188 |
| 2005/0135383 | A1 * | 6/2005 | Shenefiel ................. | 370/395.52 |
| 2005/0201302 | A1 * | 9/2005 | Gaddis et al. ................. | 370/254 |
| 2005/0265317 | A1 * | 12/2005 | Reeves et al. ................ | 370/352 |
| 2006/0026067 | A1 * | 2/2006 | Nicholas et al. ............... | 705/14 |
| 2006/0031525 | A1 * | 2/2006 | Reeves et al. ................ | 709/227 |
| 2007/0245352 | A1 * | 10/2007 | Ma ................................ | 718/105 |

(Continued)

FOREIGN PATENT DOCUMENTS
EP  1647906 A2  4/2006
(Continued)

*Primary Examiner* — Alina N. Boutah
(74) *Attorney, Agent, or Firm* — Chapin IP Law, LLC

(57) ABSTRACT

A system is shown that supplies web pages from servers (109 to 116, 301 to 305) to requesting clients (102 to 106) over the Internet (101). Each server is configured to supply web page data to requesting clients. A traffic manager (120) receives request data from browsing clients and selects one of the serving devices for serving web page data. A data manipulation station (125) manipulates request data or web page data. The traffic manager supplies a function call to the data manipulation station that includes request data or web page data using Internet protocol. The manipulation station manipulates the request data or the web page data to produce manipulated data and the manipulated date is returned to the traffic manager.

23 Claims, 18 Drawing Sheets

U.S. PATENT DOCUMENTS

| | | | |
|---|---|---|---|
| 2008/0133766 A1* | 6/2008 | Luo | 709/231 |
| 2008/0228932 A1* | 9/2008 | Monette et al. | 709/229 |
| 2009/0049161 A1* | 2/2009 | Takeuchi et al. | 709/222 |
| 2010/0030880 A1* | 2/2010 | Joshi et al. | 709/223 |
| 2010/0125640 A1* | 5/2010 | Boddington et al. | 709/206 |
| 2012/0016933 A1* | 1/2012 | Day et al. | 709/203 |
| 2012/0084639 A1* | 4/2012 | Dodrill et al. | 715/234 |

FOREIGN PATENT DOCUMENTS

| | | |
|---|---|---|
| GB | 2418500 A | 3/2006 |

\* cited by examiner

SYSTEM AND METHOD FOR SERVING WEB PAGES

CROSS REFERENCE TO RELATED APPLICATIONS

This application claims priority from United Kingdom Patent Application No. 08 07 030.2, filed Apr. 17, 2008, the entire disclosure of which is incorporated herein by reference in its entirety.

The present invention relates to apparatus for supplying web pages from servers to requesting clients over the Internet, of the type comprising a plurality of servers, each configured to supply web page data to a plurality of requesting clients; and a traffic manager configured to receive request data from browsing clients and to select one of said serving devices for serving web page data to the requesting client.

The present invention also relates to a method of performing a traffic management function to facilitate the supply of web pages from servers to requesting clients over the Internet, of the type comprising the steps of receiving request data from a browsing client to supply web page data to said browsing client from a server; and requesting web page data from a selected server in response to said request data.

BACKGROUND OF THE INVENTION

Field of the Invention

The present invention relates to the provision of web pages over the Internet is well established, in which a browser makes a request for a file to be served from a server. However, over recent years, the size and bandwidth requirement of web pages has increased and on occasion demand for particular pages can be very high. Consequently, it is necessary for similar pages to be served from a plurality of web servers at high speed if the demand for service is to be satisfied.

In order to optimise the availability of server resource, it is known to provide additional functionality within the network so as to request data from available servers; a process known as load balancing. Load balancing systems are described in US 2006/0031525, US 2005/0265317 and US 2006/0262238 each assigned to the present assignee.

In addition to providing this load balancing functionality, it is also possible for equipment of this type to provide additional functionality where it is possible for decisions to be made based on the nature of a request or upon the nature of web page data returned from a server. In this way, particular requests may be screened or modified. Furthermore, returned data may be modified or optimised so as to make use of the available bandwidth.

Many techniques are known for modifying data of this type and many procedures are available, often from open source developers. However, a problem exists in terms of making this functionality available within proprietary load balancing apparatus.

BRIEF SUMMARY OF THE INVENTION

The invention provides apparatus for supplying web pages from servers to requesting clients over the Internet. The apparatus comprises a plurality of servers each configured to supply web page data to a plurality of requesting clients along with a traffic manager configured to receive request data from browsing clients and select one of the serving devices for serving web page data to the requesting client. In addition, there is provided a data manipulation station configured to manipulate the request data or the web page data. The traffic manager supplies a function call to the data manipulation station that includes request data or web page data, using Internet protocol. The manipulation station manipulates the request data or the web page data to produce manipulated data and the manipulation station returns the manipulated data to the traffic manager.

DESCRIPTION OF THE BEST MODE FOR CARRYING OUT THE INVENTION

FIG. 1

Figure 1:
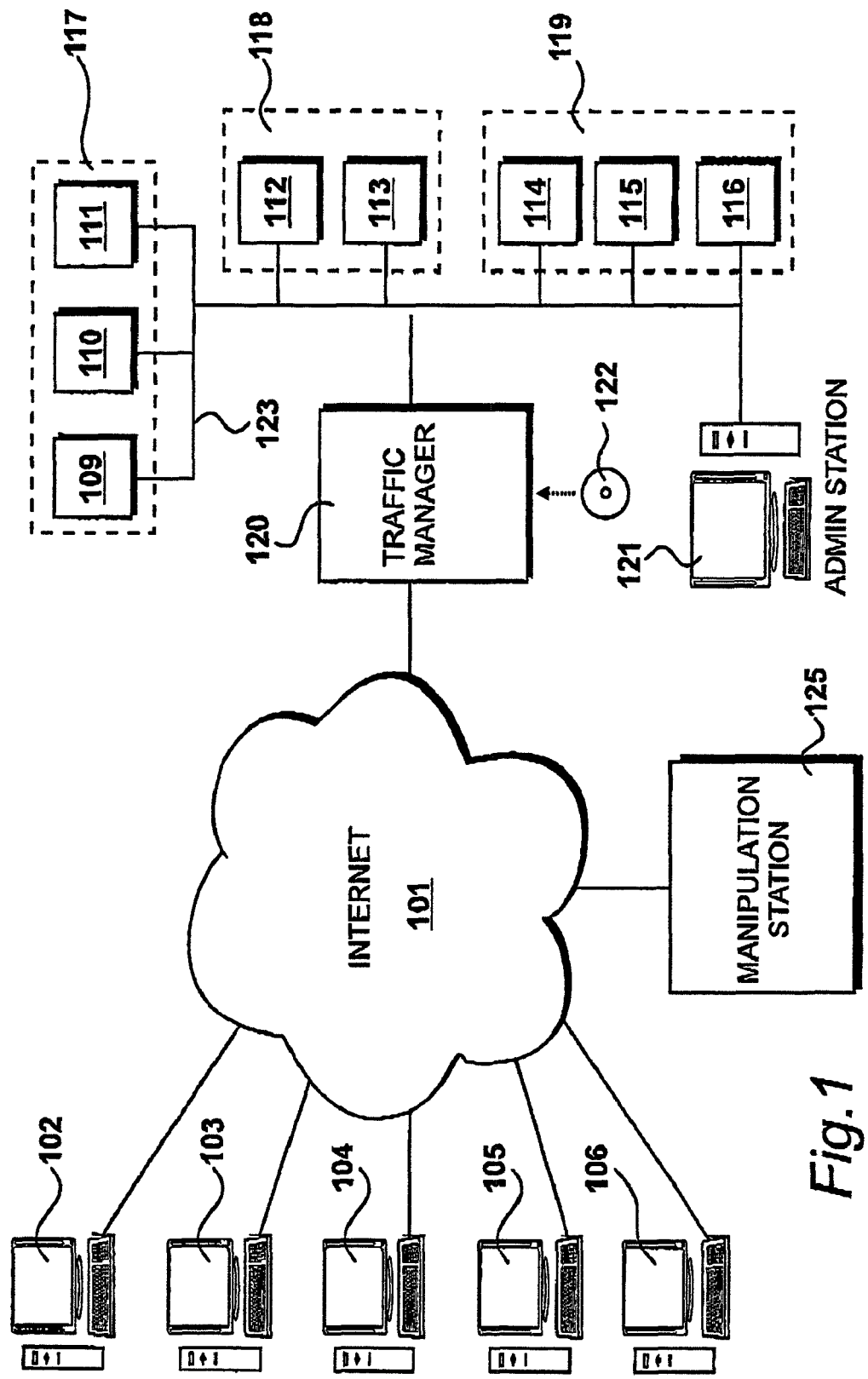
FIG. 1 shows an environment providing communication between servers and clients.

An environment is shown in FIG. 1 in which communications between servers and clients are provided by the Internet 101. Five clients 102 to 106 are shown, although it should be appreciated that this is merely representative of the many thousands of clients requesting data from servers. These browsing clients include personal computers equipped with browsing software, such as Internet Explorer or Firefox for example. Browsing devices also include mobile wireless connected devices, such as portable computers, personal digital assistants and smart mobile telephones.

Physical serving devices (servers) 109 to 116 are organised into three server pools consisting of, in this example, a first pool 117, a second pool 118 and a third pool 119. The first pool 117 is for the secure servers running secure protocols, suitable for online sales and other secure 115 transactions. The second pool 118 provides dynamic web page content requiring a relatively high level of server processing and the third pool 119 includes a collection of inexpensive commodity servers for serving static web pages. It should also be emphasised that this merely represents an example and that many configurations of this type are possible.

A traffic management system 120 monitors client's requests and directs requests to an appropriate server pool. To do this, the system is provided with functionality enabling it to analyse client requests in detail. Furthermore, additional operations are carried out by the traffic management system (during and after request analysis) in order to maintain a high number of simultaneously connected clients without overloading any of the servers 109 to 116.

In order to facilitate the configuration of the servers and the traffic management system 120, an administration station 121 is provided, having human interface peripheral equipment including a monitor and a keyboard etc. A data carrying medium such as a DVD 122 is illustrated as a means for supplying executable instructions for the traffic managing process to a traffic manager platform. Alternatively, traffic managing instructions may be loaded onto the traffic management system from the Internet and the transfer of such instructions may be controlled via the administration system 121. A network 123 connects the servers 109 to 116 with the traffic management system 120 and the Internet 101. Thus, in this embodiment, the traffic management system is implemented by a programmable platform having executable instructions installed thereon.

The example also shows the provision of a manipulation station 125 which may be provided within the environment of the traffic manager 120 or communication may take place over a substantial distance via an Internet connection, as illustrated in FIG. 1. The point of note is that the manipulation station represents an alternative environment to that of a traffic manager 120 and communication between the traffic manager 120 and the manipulation station 125 takes place using Internet protocol (TCP/IP), thereby allowing each environment to be developed independently.

A plurality of servers 109 to 116 are provided, each configured to supply web page data to a plurality of requesting clients 102 to 106. The traffic manager 120 is configured to receive request data from browsing clients and to select one of the serving devices for serving web page data to the requesting client.

The particular combination of devices within the environment of FIG. 1, includes the provision of a data manipulation station 125 configured to manipulate request data or web page data. In this configuration, the traffic manager 120 supplies a function call to the data manipulation station 125 that includes request data or web page data, using Internet protocol. The manipulation station 125 manipulates the request data or the web page data to produce manipulated data which is then returned to the traffic manager 120.

Preferred methods of operation for the apparatus as illustrated in FIG. 1 are detailed with reference to FIG. 3.

FIG. 2

Figure 2:
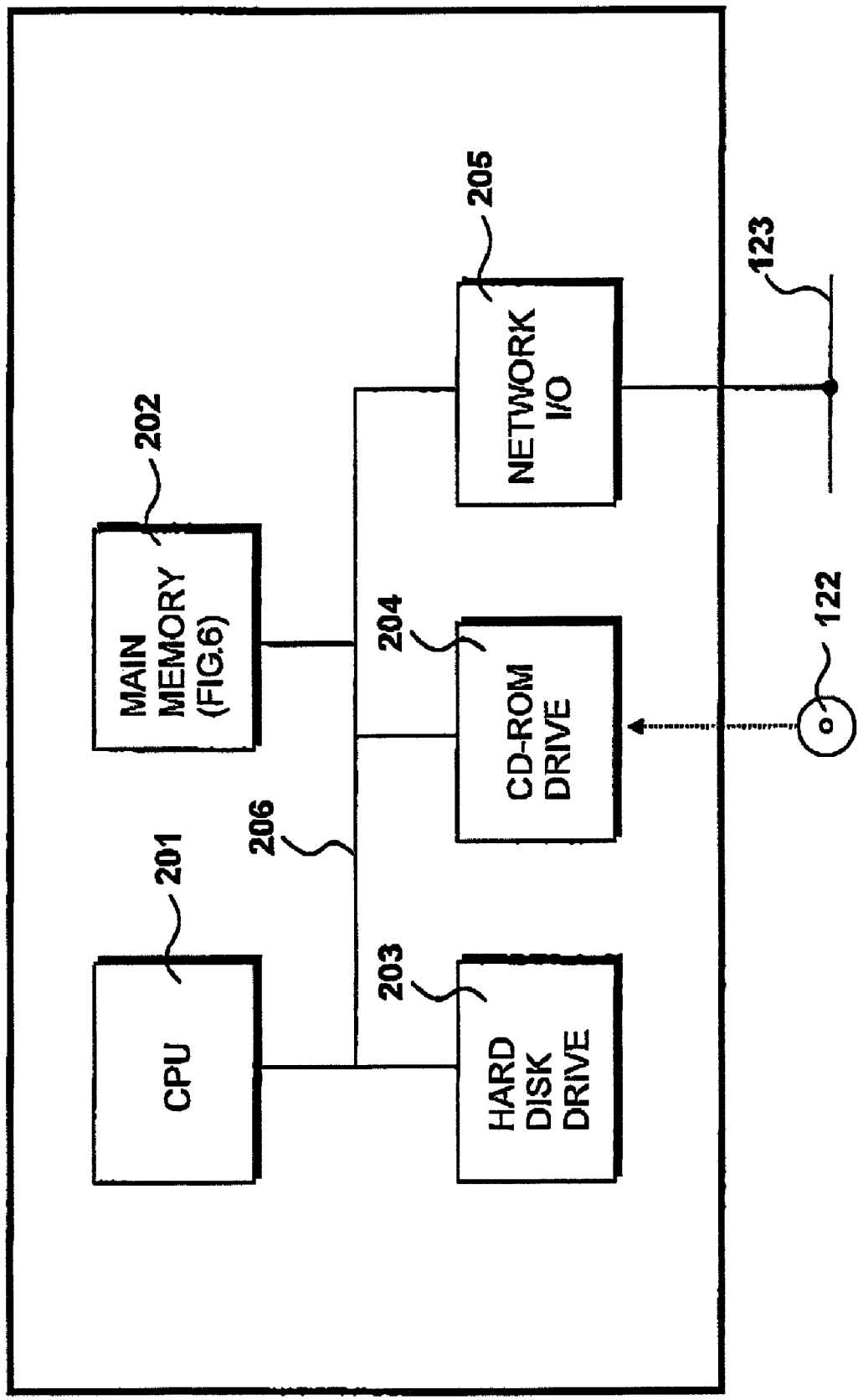
FIG. 2 shows a hardware platform for implementing instructions of traffic management.

Instructions for the implementation of traffic management are executed on a hardware platform such as that illustrated in FIG. 2. The traffic management platform is controlled by the administration system 121 and therefore does not require its own output monitor or input keyboard etc. Typically, hardware of this type is in the form of a rack mounted unit and several such units may be provided within a rack so as to provide a degree of redundancy in case of hardware failure. It should also be appreciated that servers 109 to 116 may be configured in a similar fashion either locally, at an alternative site or even distributed globally.

A central processing unit 201 is provided along with memory devices 202 to facilitate the storage of instructions and data that require regular access while the system is in operation. A hard disc drive 203 is included to provide non-volatile storage of instructions and configuration data. Disc 203 also provides access to infrequently used data during operation. Upon system initialisation, configuration files and executable instructions are loaded from disc drive 203 and stored in main memory 202.

For the optional loading of traffic managing instructions from data carrying media, a DVD drive 204 is provided and is configured to receive instructions from an instruction carrying medium such as a DVD disc 122. In addition, one or more network connections are provided by at least one network interface 205 thereby allowing the traffic management system to connect to the local network 123 and to the Internet 101. Internally, devices 201 to 205 are connected via data bus 206.

FIG. 3

Figure 3:
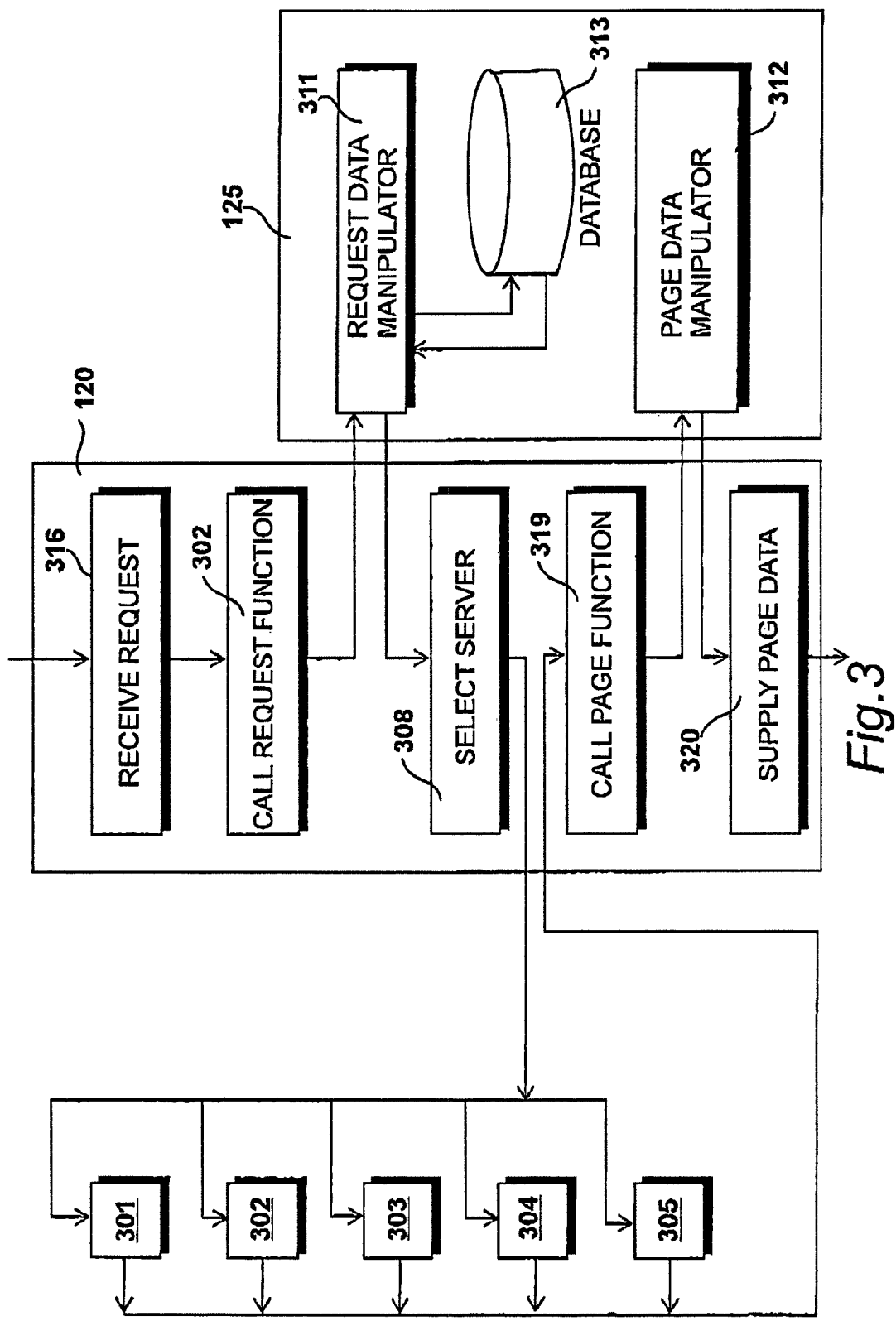
FIG. 3 details the functionality performed by the platform of FIG. 2.

Functionality of the environment illustrated in FIG. 1 is shown schematically in FIG. 3.

In this example, five servers are shown, identified as 301, 302, 303, 304 and 305. The manipulation station 125 is shown as consisting of a request data manipulator 311 and a page data manipulator 312. Furthermore, the request data manipulator 311 has access to a database 313. The request data manipulator 311 and the page data manipulator 312 could be housed in a shared facility. Alternatively, given that communication takes place using Internet protocol, it would be possible for these devices to be housed separately and multiple instantiations of each could be present.

FIG. 3 illustrates the functionality of traffic manager 120. Process 316 receives a request from a browsing client, such as client 102. In this example, the traffic manager calls a request function at 317 resulting in a call to the request data manipulator 311. The request data manipulator may retrieve data from database 313 and thereafter a manipulated data request is returned to the traffic manager 120.

At step 318 the core functionality of the traffic manager is invoked by server selection. Thus, process 318 makes a request to one of the available servers 301 to 305 and the requested server returns a web page to the traffic manager 120.

At the traffic manager 120, in this embodiment, a page function is called by process 319. This results in a function call being made to the page data manipulator 312 such that manipulated page data is returned to the traffic manager 120. Thereafter, at process 320 the page data is supplied back to requesting browser 102. Thus function calls are provided to manipulate the originating request and/or to manipulate the returned page data.

The system is capable of invoking a method of performing a traffic management function to facilitate the supply of web pages from servers to responding clients over the Internet 101. The traffic manager 120 receives request data from a browsing client 102 to supply web page data to the browsing client from a server, such as server 301. At the traffic manager 120, it would be possible to manipulate the request before retrieving the page data from server 301. However, in this embodiment, a function call is supplied to request data manipulator 311 using Internet protocol, whereupon it is the request data manipulator that is configured to manipulate the request data. In this way, it is possible for the manipulation of the request data to be effected outside the proprietary traffic manager environment 120 and for the manipulation to occur at the generic manipulation station 125. In a preferred embodiment, a Java environment is established within the manipulation station 125.

The manipulated request data is received from the manipulation station using Internet protocol in response to the function call. This manipulated request is then used to address server 301, selected by process 318. A web page is received from the server in response to the manipulated request and the received web page is then served to the browsing client.

In a preferred embodiment, use is made of database 313. In particular, the request data manipulator 311 uses database 313 to assess whether a user of the browsing client is authorised to receive the requested web page. Having made this enquiry, the request data is manipulated by being retained in its current form thereby allowing the addressing of the server to take place. Alternatively, if access is not permitted, the request is manipulated substantially by returning a notification to the effect that access is not permitted.

In a preferred embodiment, it is possible for a request for additional c information about a user or a browser to be generated by the request data manipulator 311 and returned to the traffic manager 120. Under these circumstances, the requested information is returned from the traffic manager 120 to the request data manipulator 311. Furthermore, in a preferred embodiment it is possible for request type frequencies to be monitored so as to anticipate requests from the manipulation station and in particular from the request data manipulator. Thus, if the traffic manager notices that particular data types are being requested on a regular basis, the request is anticipated and the information is supplied automatically to the request data manipulator 311.

As previously described, it is also possible for the manipulation station 125 to make modifications to page data, by making use of the page data manipulator 312.

Under these circumstances, there is provided a method for performing a traffic management function at the traffic manager 120 to facilitate the supply of web pages from servers to requesting clients over the Internet 101.

Requests for data are received from browsing clients to supply web page data to the browsing client from a server. For this particular implementation, the web page data is requested from a selected server by means of the server selection process 318. Web page data is received and upon receiving this web page data, a function call is supplied to manipulating station (in particular the page data manipulator), using Internet protocol, wherein the manipulation station is configured to manipulate the web page data. Manipulated web page data is then received from the page data manipulator in response to the function call, again using Internet protocol. The manipulated web page is then served to the browsing client.

In an embodiment, the manipulation station (the page data manipulator 312) is configured to modify or delete specified textural matter. For example, this textural matter could include financial data.

In an alternative embodiment, the manipulation station (the page data manipulator 312) is configured to modify page bandwidth. Thus, under these circumstances, high bandwidth portions of a page, such as images, may be removed or modified. Thus, in one example, a high bandwidth image could be replaced with a similar image of lower definition.

The present applicant licenses traffic management software under the trademark "ZXTM". ZXTM includes TrafficScript (trademark) that allows customers to extend the functionality of ZXTM and add extra logic to how it processes connections. Additional functionality could be added within the TrafficScript environment but additional features are also provided in accordance with the present invention by adding support for Java. Thus, in a preferred embodiment, the traffic management system 120 executes TrafficScript whereas the manipulation station 125 invokes Java.

The provision of Java allows customers to access features such as arrays, tables, enhanced string support and functions by making a function call from the TrafficScript environment. Within the Java environment, library support exists for network input/output, database access and XML processing etc. It facilitates support for writing multi-threaded code along with the inclusion of functions that block or maintain states between requests.

In a preferred embodiment, ZXTM is extended to support running Java using the well established Servlet API. These Servlets are runnable via TrafficScript and it is possible that everything that currently runs by means of TrafficScript may also run via Java, thereby giving developers a choice as to which environment they wish to use.

In accordance with the present invention, the Java code runs in a separate process to ZXTM and the ZXTM process communicates with the Java runner via sockets, making use of a text-based protocol.

In operation, the Java process (at the manipulation station) listens for requests from ZXTM (from the traffic manager) and creates a new thread to deal with each request.

The invocation of Java is triggered by a TrafficScript rule and the Java Servlets are usable via TCP connections; it being appreciated that Servlets are not HTTP specific.

The existing Java Servlet Application Program Interface (API) provides a way for the Java code to interact with TrafficScript Traditionally, Servlets are used to generate content and the API provides a mechanism for them to read details of the request and to specify a response. The API has therefore been extended to let Servlets be used as response rules such that Servlet calls may read details of a response. Functions are also added to allow Servlets to modify requests so that they can be passed on to the real content generators.

A valid Servlet implements the Servlet Java interface which provides one basic method which is called by the Servlet runner when a new request comes in. This may be called with two classes, consisting of a Servlet request object, which provides methods to read details of a request and a Servlet response object providing methods to set the details of the response. Thus, in the embodiment, the request class is used by the request data manipulator 311 and the response class is used by the data page manipulator 312. TrafficScript includes classes that extend some of the base Servlet framework and a version of Servlet session persistence is required, achieved by setting Cookies or altering URLs.

Java's session persistence allows Servlets to store per-connection data that can be retrieved for future requests. This information may be stored in memory 202 or by writing files to hard disc drive 203.

Figure 4:
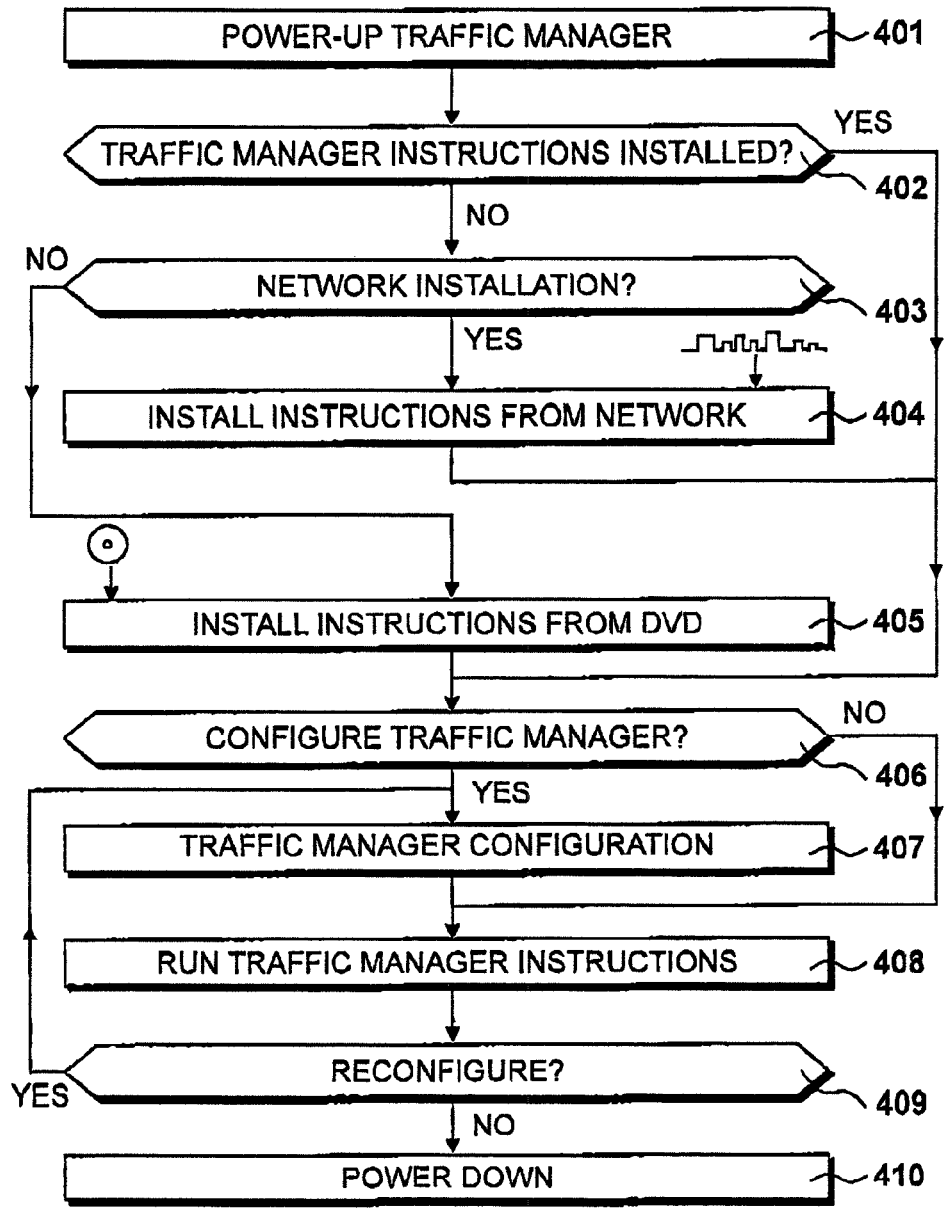
FIG. 4 shows operations performed within the traffic manager 120.

When ZXTM wants to run a Servlet, it sends the request over to the runner, together with preliminary details. If the Servlet needs more information it can request them from ZXTM later; connections between ZXTM and the runner can be kept open and pulled for future use, to improve efficiency.
FIG. 4

Operations performed within the traffic manager 120 are illustrated in FIG. 4. At step 401 power is supplied to the system and a question is asked at step 402 as to whether instructions have been installed. When answered in the negative, a question is asked at step 403 as to whether a network installation is to be performed. When answered in the affirmative, instructions are installed from the network at step 404 or alternatively when answered in the negative, instructions are installed from DVD at step 405. At step 406 a question is asked as to whether the traffic manager is to be configured and when answered in the affirmative, system configuration is performed at step 407. When answered in the negative or upon completion of step 407, the traffic management instructions run at step 408.

Upon completion of a run, a question is asked at step 409 as to whether reconfiguration is required which when answered in the affirmative, results in control returning to step 407 for the reconfiguration to be performed. When answered in the negative, the system is powered down at step 410.

FIG. 5

Figure 5:
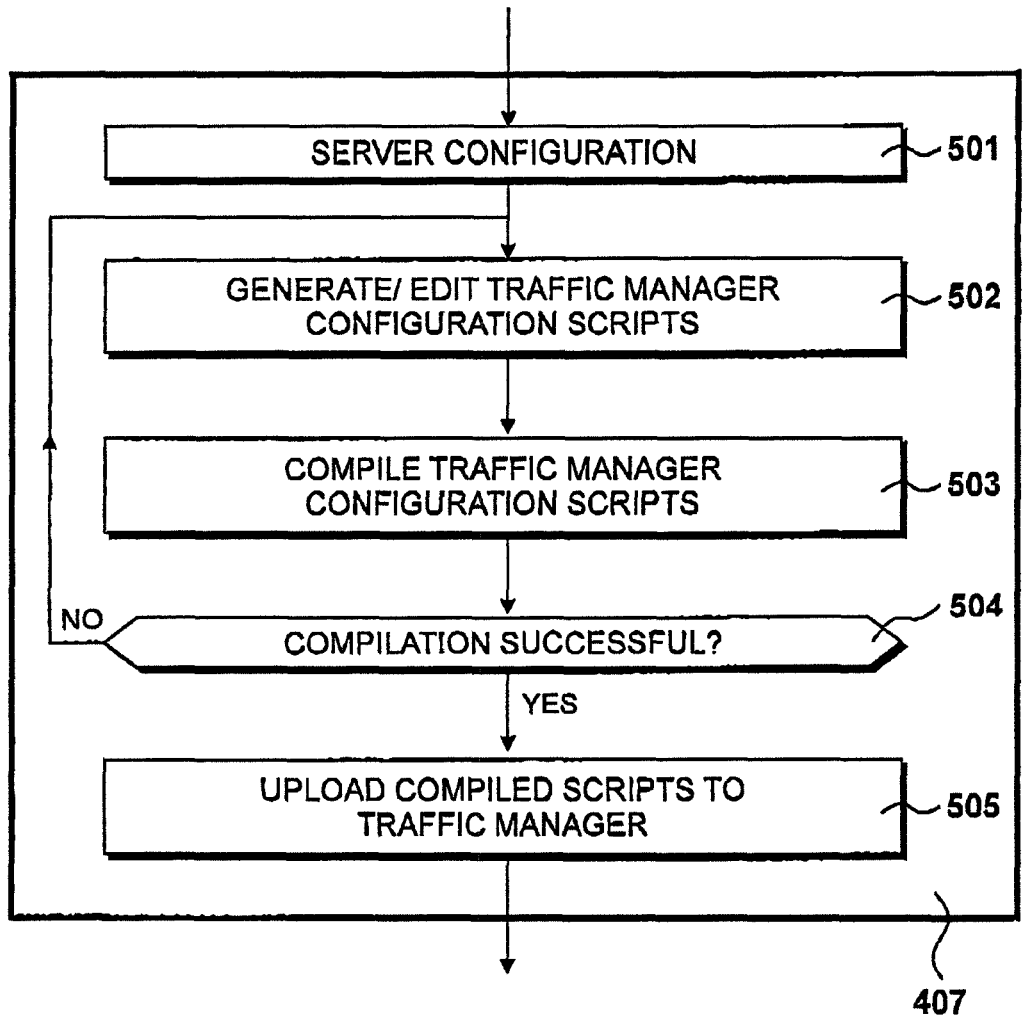
FIG. 5 details procedures for the configuration of a traffic management system identified in FIG. 4.

Procedures 407 shown in FIG. 4 for the configuration of the traffic manager 120 are detailed in FIG. 5. At step 501 server configuration is performed that involves assessing configuration parameters for each of the servers 109 to 116. The individual servers are assigned to pools and this pool configuration data is then supplied to the traffic manager.

At step 502 traffic management configuration scripts are generated and edited as appropriate. The present embodiment provides an environment in which the scripts may be written in Java for execution at the manipulation station 125 in response to calls being made by the traffic manager 120. The compilation of scripts may result in the generation of syntax or other errors which are identified by the compiler during the execution of step 503 and displayed to an operator at the administration station 121. If compilation is not successful, it is necessary for the errors to be fixed by an editing operation being performed on the offending script or scripts. Thus, the provision and use of Java libraries facilitates the building of larger and more sophisticated operations while minimising the risk of errors and bugs being introduced which may or may not be identified during the compilation process. Thus, at step 504 a question is asked as to whether a compilation has been successful and if answered in the negative control is returned to step 502.

At step 505, following successful compilation, complied scripts are loaded to the traffic manager 120. The uploaded scripts are stored on hard disc drive 203, for subsequent loading into main memory 202 when the system is operating.

FIG. 6

Figure 6:
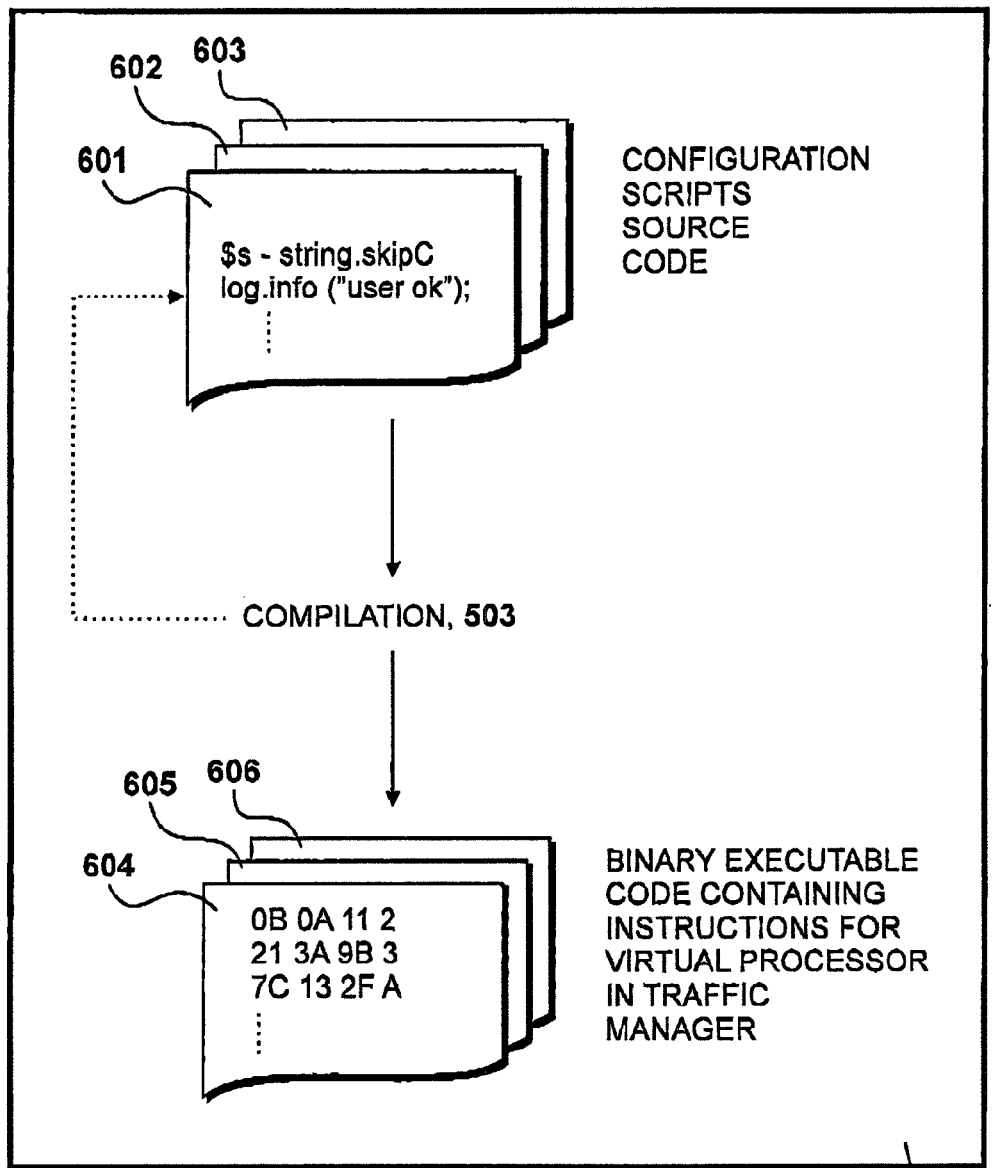
FIG. 6 shows an illustration of the compilation process.

An illustration of the compilation process is shown in FIG. 6. High level language configuration scripts 601 to 603 are compiled (by process 503) into respective files of binary executable code containing instructions for a virtual processor running on the traffic management system 120. Alternatively, and in addition thereto, code is generated for execution via a Java virtual processor implemented by the manipulation station 125.

FIG. 7

Figure 7:
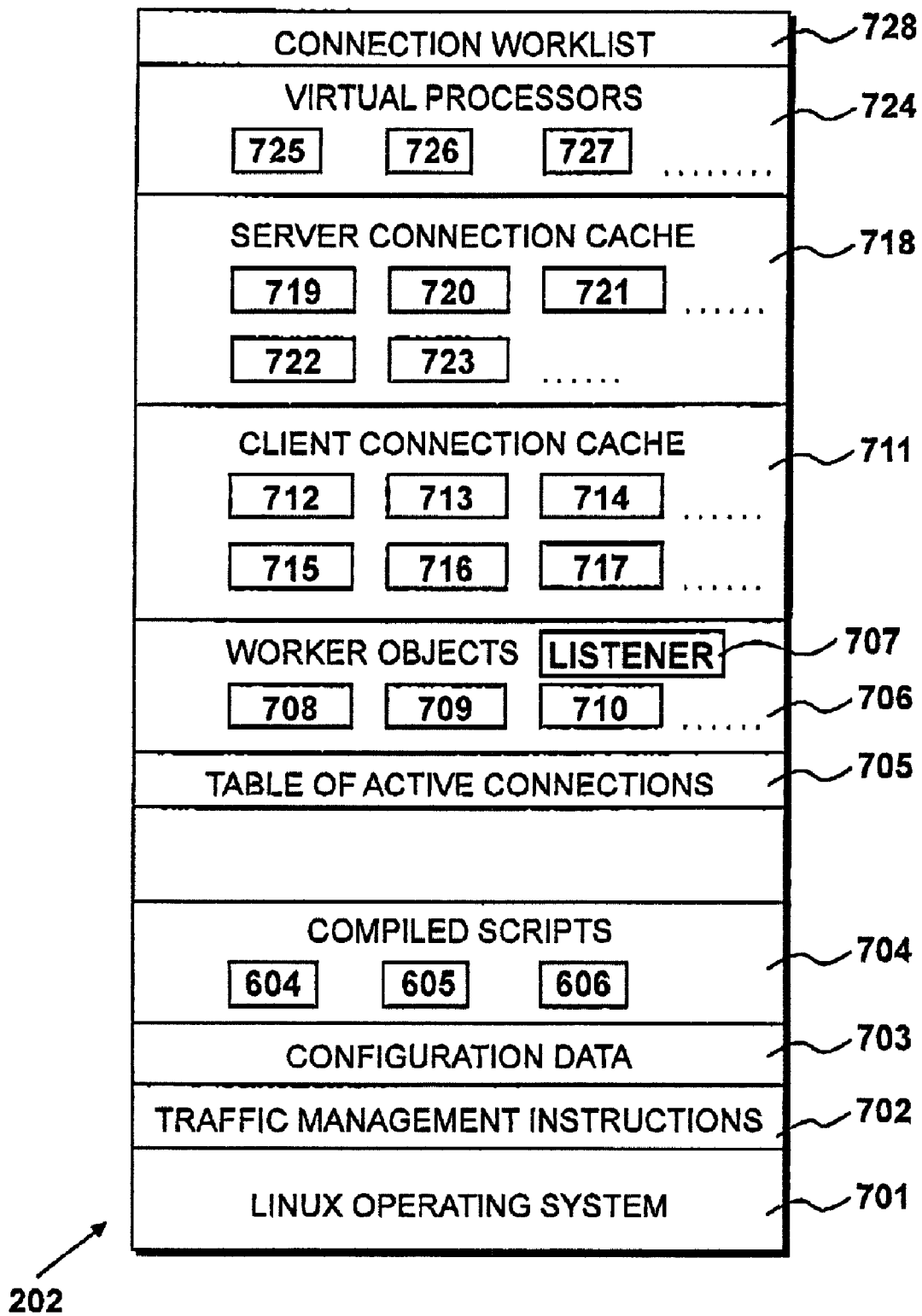
FIG. 7 shows an example of data contained in main memory.

An example of the data content of main memory 202 is illustrated in FIG. 7. At 701 an operating system is stored such as Linux. At 702 traffic management instructions are stored, possibly derived from an installation process from DVD as previously described. At 703 configuration data is stored, such as that defining the grouping of servers into pools plus the IP address or addresses assigned to the traffic manager. Compiled scripts, such as scripts 604, 605 and 606 are stored at 704.

Figure 8:
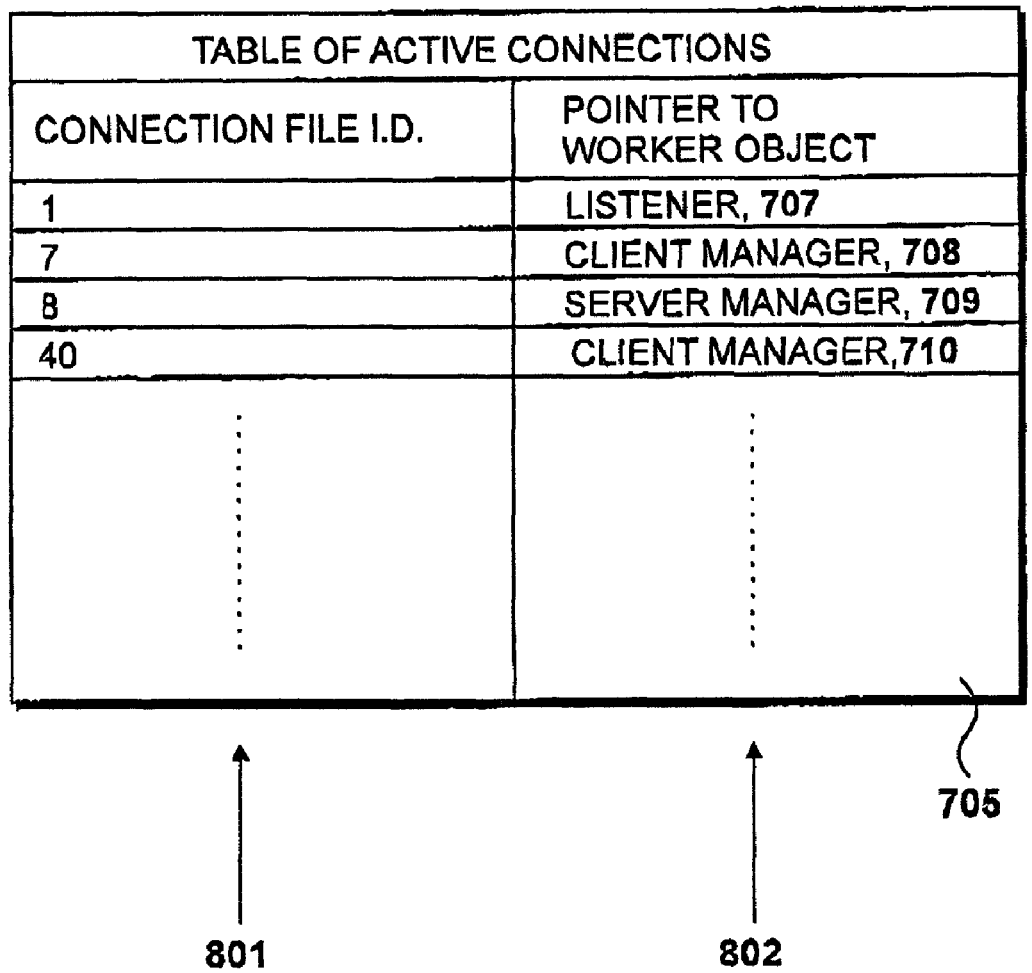
FIG. 8 shows a table of active connections.

At 705 a table of active connections is stored. Connections are made (typically TCP/IP connections) between the traffic manager 120, the client browsers (client side connection), the servers (server side connections) and to the manipulation station 125. These connections are listed in the table of active connections, described with reference to FIG. 8.

At 706 worker objects are stored. Each connection has an associated worker object and these worker objects come in different forms, such that each has a specialised task. When the traffic management system starts up, it starts with a single worker object specialised as a listener, illustrated at 707. The listener object 707 has the sole task of listening for incoming new connections from clients. The listener object creates a new worker object (708) when it gets a new client trying to make such a connection. This new object is specialised as a client manager and client manager objects typically require access to the server so that these in turn create a server manager object 709.

The traffic management instructions make provision for the inclusion of a worker-based class, from which several other specialised classes inherit shared functionality, such as the ability to read from and write to the TCT/IP connection. These derived classes are customised into different variants but generally the worker objects, regardless of specialisation, are treated equally.

A client connection cache is provided at 711. The cache 711 stores connections from clients that can be reused by the client rather than establishing new connections. In the example shown, the client connection cache 711 includes cached client connections 712 to 717. These are connections that have been maintained by HTTP keep alive protocols, or are simply those which have not yet been disconnected by the client.

At 718 there is provided a server connection cache. Cache 718 stores details of cached connections to servers that can be reused. The cache includes details of cached server connections 719 to 723 and these connections are reused preferably on a Most Recently Used (MRU) basis. Thus the cache operates an MRU cache policy, since more recently used connections are less likely to be broken by the server through a timeout.

The cache connections can only be reused if they provide connection to the required pool, so the cache includes server pool assignment information. In this way, it is possible to reuse at least one of the server side connections for one or more of the client side connections. This makes better use of the limited number of server side connections available (effectively allowing them to be shared over a number of browsers) while at the same time minimising the re-establishment of connections which in turn reduces processor overhead.

At 724 instructions for virtual processors are stored, including virtual processors 725, 726 and 727. These virtual processors are created and deleted as required by the worker object 706. Typically, a virtual processor object is created when a new client connection is made. The virtual processor object executes the compiled scripts 704 to determine whether traffic management actions need to be taken for the new connection. These actions include the possible instant discarding of the connection, without making connection to the server at all. Thus, a decision of this type may be made directly by the traffic manager 120 (for security reasons) or by the manipulation station 125 for access reasons. Tests established by the traffic manager 120 may be retained while additional tests may be invoked with reference to a call to the manipulation station 125.

At 728 a connection work list is stored. During operation, the traffic management system may or may not require processing to be performed on each of the connections in the table of active connections. The connection work list indicates which of the active connections require work to be done. It also defines whether the work to be done includes a read or a write operation. A table of active connections 705 is detailed in FIG. 8.

FIG. 8

Each TCP/IP connection used by the traffic management system 120 is assigned a file identification by the operating system 701. The numerical value of the file ID is arbitrary and is provided as a unique way of identifying a connection.

The table of active connections associates active connections 801 with worker objects 802 that handle the connections. For example, the listener worker object 707 is associated with a connection that has a numerical file ID value of 1.

Client manager 708, the server manager 709 and another client manager 710 are each associated with a file ID such as 7, 8 and 40 respectively for a particular connection.

When a traffic manager is started, only the listener object is present. However, as clients make requests, many hundred of such entries will exist in the table of active connections 705.

FIG. 9

Figure 9:
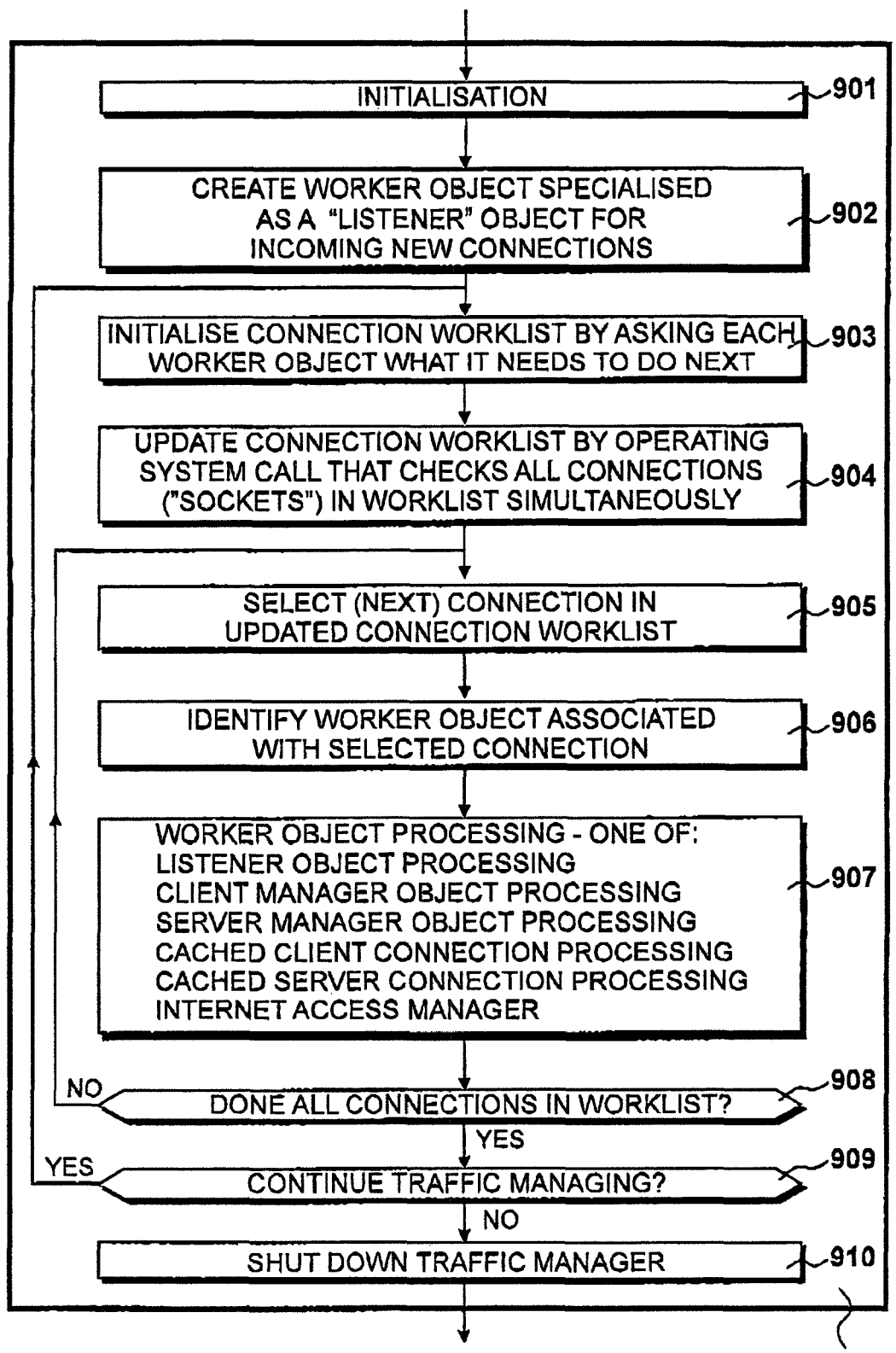
FIG. 9 illustrates operation of the traffic manager.

The execution of the traffic manager instructions 408 is detailed in FIG. 9. At step 901 data structures are initialised and at step 902 a single worker object is created that specialises in listening (usually on port 80) for incoming client requests. This is the listener object 707.

At step 903 a connection work list is initialised by asking each of the worker objects what it needs to do next, ie whether the object needs to read, write or do nothing. Initially there will only be the listener object which always requests a read operation on the basis that its purpose is to identify attempts made by clients to make open a connection.

The connection work list 728 supplies arguments on entry to step 904. Upon exit from step 904, the connection work list has been updated. Thus, having started with a list of connections for which work would like to be done, a list of connections is provided that are now ready for work to be done.

At step 905 a connection in the updated work list is selected. At 906 the worker object associated with that connection is identified by considering the table of active connection 705.

At step 907, processing is performed in response to the instructions of the worker object. Thus this involves object processing for the following worker types: listener, client manager, server manager, cached client connection, cache server connection and Internet access manager. The cached connections have worker objects as various maintenance operations are required even though these connections are effectively dormant. In particular, an unused connection may be broken by the other party, meaning that it can no longer be used and should therefore be removed from the cache. Each client request includes information on whether the connection should be kept alive or closed. This information is removed by a traffic manager before the request is forwarded to a server. Similar information is included in server responses and is likewise removed.

At step 908 a question is asked as to whether all connections in the work list have been serviced and when answered in the negative control is returned to step 905 whereupon the next connection is selected. When the question asked at step 908 is answered in the affirmative, to the effect that all of the connections have been serviced, a question is asked at step 909 as to whether traffic management is to continue. When answered in the affirmative, control is returned to step 903 resulting in the re-initialisation of the connection work list. Alternatively, if the question asked at step 909 is answered in the negative, the traffic management system is shut down at step 910.

FIG. 10

Figure 10:
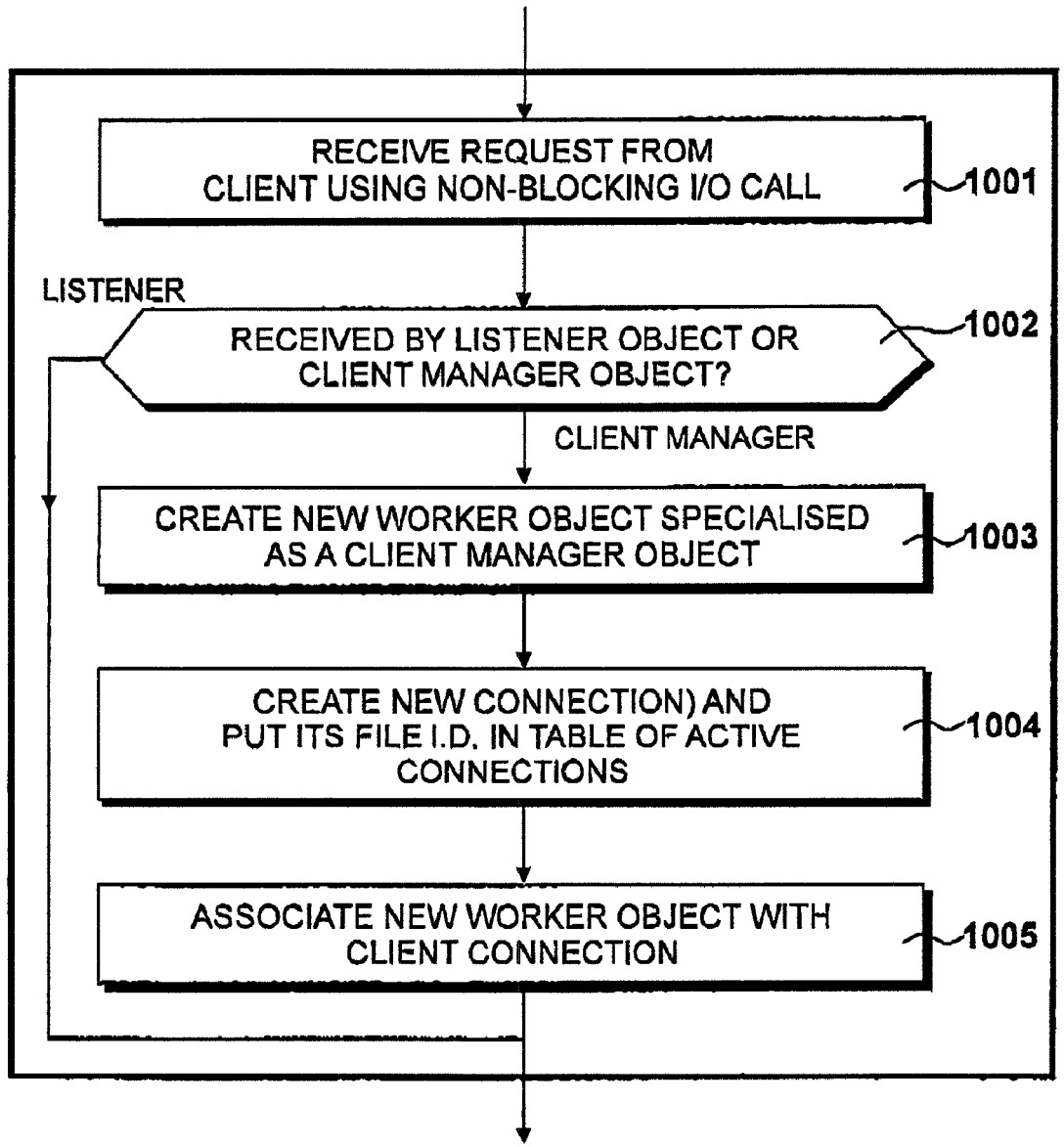
FIG. 10 details procedures for processing operations identified in FIG. 9.

Procedures 907 for object processing are detailed in FIG. 10. At step 1001 a new request is received from a client A listener object listens on port 80 and a client issuing a request can either reuse an existing keep alive connection to the traffic manager or create a new TCP/IP connection on which to transmit its request.

At step 1002 a question is asked as to whether this request has been received by the listener object, meaning that a new connection is required by a client manager object in the connection cache. If it has been received by a client manager object, the cache connection for that object is used and the procedure is complete.

If it is received by the listener object at step 1003, a new worker object specialising as a client manager is created. Thus, for example, client manager 708 would be created at this step because there is a client making a request for some data, such as a web page, to be supplied from a server.

At step 1004 a new connection (socket) is created and the file ID for this connection is entered in the table of active connections. To achieve this, a system call "accept" is made. This takes the incoming client request, accepts t as a valid TCP request and sets up a new additional socket for the connection. The new worker object is associated with the client connection at step 1005. The connection has its own unique file ID and a new entry is made in the table of active connections 705, associating the file ID of the connection with the new worker object which, in this example, is a worker object specialised as a client manager object 708.

The effect of steps 1003 to 1005 is to set up a client manager object for an incoming client request on a new channel. The client manager object has its own connection with the client that can be read from and written to as required. At this stage, it is not yet known which server is to be assigned a new client.

Once the new client manager object has been created and is present in the list of active connections, it will be processed as one of the worker objects and thereby dealt with in the main loop of steps 905 to 908.

FIG. 11

Figure 11:
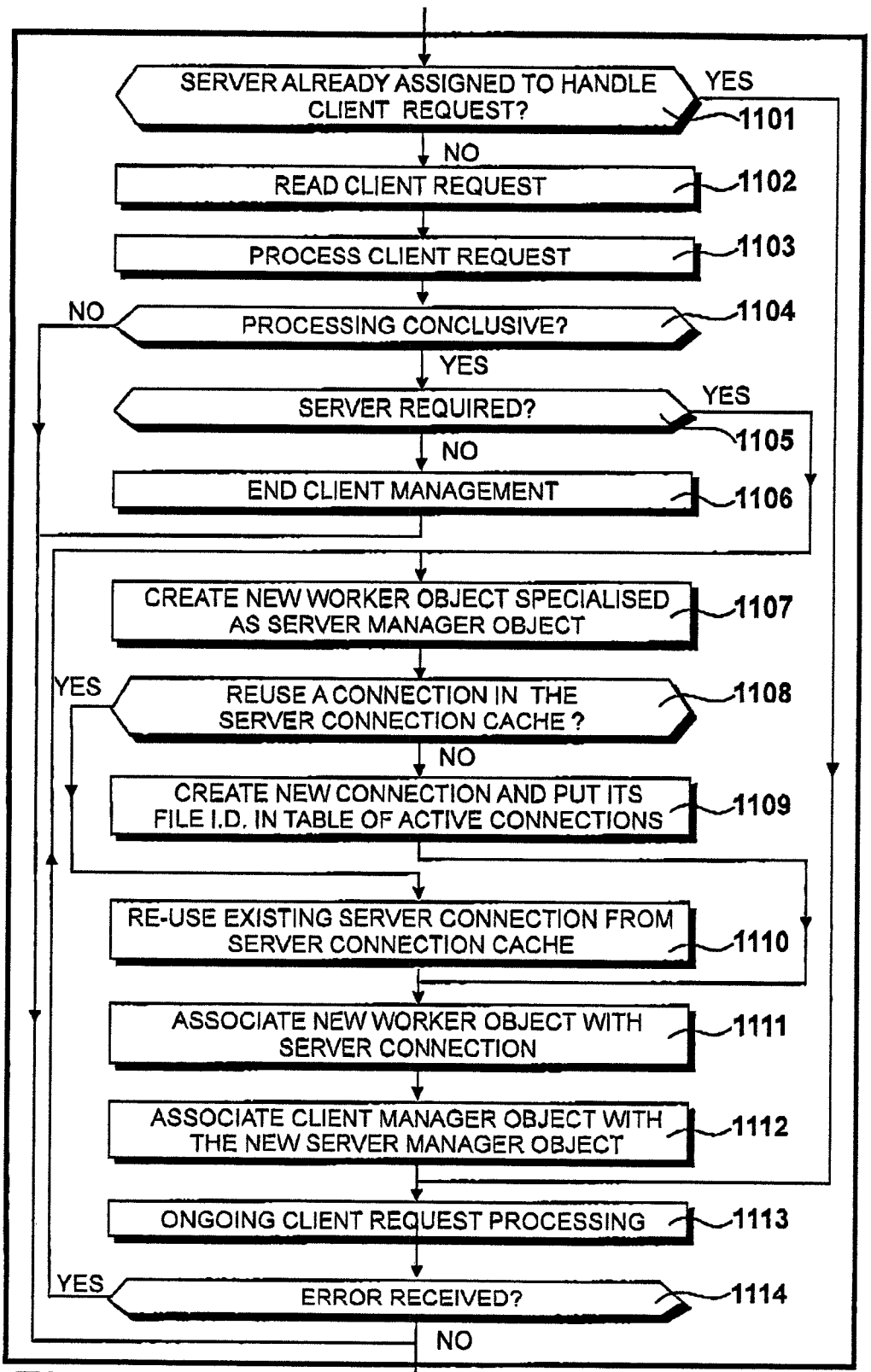
FIG. 11 shows processing procedures implemented by a client manager object.

The processing procedures implemented by a client manager object are detailed in FIG. 11. At step 1101 a question is asked as to whether a server has already been assigned to handle the client request. Initially, when a client manager object 708 has been created, it will only have a connection with the client. It uses this connection to receive the request in full and to analyse it. Based on this analysis, a server pool is chosen based on the nature of the request being made. The client manager object does not itself communicate directly with the server and this communication is facilitated by a server manager created for the purpose.

If the question asked at step 1101 is answered in the affirmative, control is directed to step 1113 for the ongoing client request processing. If the question asked at step 1101 is answered in the negative, a non-blocking read of the client request is made at step 1102.

At step 1102 the data received from the client is read, so a certain amount of data is received but control is never interrupted, regardless of the quantity of data that is supplied by the client connection.

At step 1103 script base processing of the request is made, resulting in the request being analysed in accordance with the compiled scripts. This may result in a function call to the manipulation station 126.

At step 1104 a question is asked as to whether the script based processing is conclusive and when answered in the negative control is directed to step 908. It is possible that not enough data has been received from the client to analyse the request conclusively. If the script based processing requires more data, processing states are stored for later recovery after more data has been received.

At step 1105 a question is asked as to whether a server is required and when answered in the negative, this results in the end of client management.

To reach step 1105 the script based processing must have been successful and this typically results in an indication to the effect that a server from a particular pool is required. If a server is required as identified at step 1105, the script based processing will have defined which pool the server should belong to. It may also define other parameters including how requests should be modified before being passed to the server and also how server data should be modified before being passed to the client.

Although transparent to the user, such modifications may take place within the traffic manager 120 or, in response to function calls, manipulation or additional manipulation may be provided by the manipulation station, specifically the page data manipulator 312.

In response to the question asked at step 1105 being answered in the affirmative, control is directed to step 1107. At step 1107 a new worker object is created that specialises as a server manager object.

At step 1108 a question is asked as to whether to reuse a connection in the server connection cache. If the question asked at step 1108 is answered in the affirmative, control is directed to step 1110 resulting in the reuse of an existing server connection. If the question asked at step 1108 is answered in the negative, a new socket is created and its file ID is put in the table of active connections at step 1109.

The completion of step 1109 or step 1110 results in control being directed to step 1111. At step 1111 a new worker object is associated with the server connection.

At step 1112 the client manager object is associated with the new server manager object. Thus, at this stage, two worker objects have been established. The client manager 708 handles the connection between the traffic manager 120 and the client. The server manager object handles the connection between the manager 120 and the server 115. An association with each other to allow data to pass between them is achieved in this example by each object having a pointer to the other.

At step 1113 ongoing client request processing is conducted. Having set up the server manager object there is now the potential for communication between the client and a server which occurs at this stage. This is mainly the transfer of data from the server which is then subsequently modified by the traffic management system and supplied to the client.

At step 1114 a question is asked as to whether an error occurred while processing the client request. This can occur particularly when a cache connection is selected for reuse at the same time as a server decides to close the connection, for example due to a time out. A traffic management system will receive an error when it attempts to issue a request down this closed connection. Thus if this question is answered in the affirmative control is returned to step 1107 to identify a new connection.

FIG. 12

Figure 12:
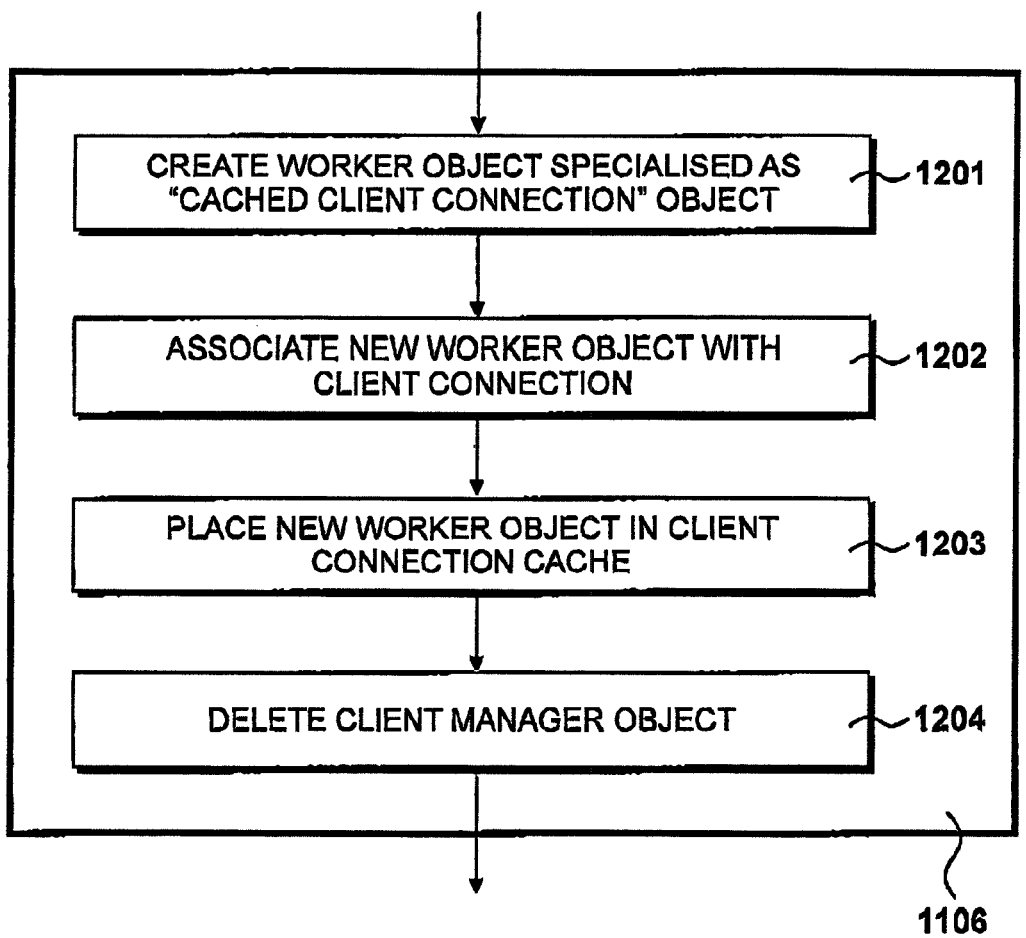
FIG. 12 shows procedures for ending client management.

Procedures 1106 for ending client management are detailed in FIG. 12. When ending client management, the previously used client connection can be put back into the client connection cache for possible reuse. Cached client connections have their own specialised worker objects in the form of cached client connection objects.

At step 1201 a cached client connection object is created as a new worker object specialised for this purpose. At step 1202 the new worker object is associated with a client connection. Thus, in the table of active connections 705, the object associated with the client connection is changed from the client connection manager object to the new cached client connection object.

At step 1203 the new worker object is placed in the client connection cache. To implement this, a pointer to the new client connection object is stored in a client connection cache 711, the client connection cache is configured to store pointers to these worker objects not to the connections themselves.

At step 1204 the client manager object is deleted; the connection has been cached and the client manager is no longer required.

FIG. 13

Figure 13:
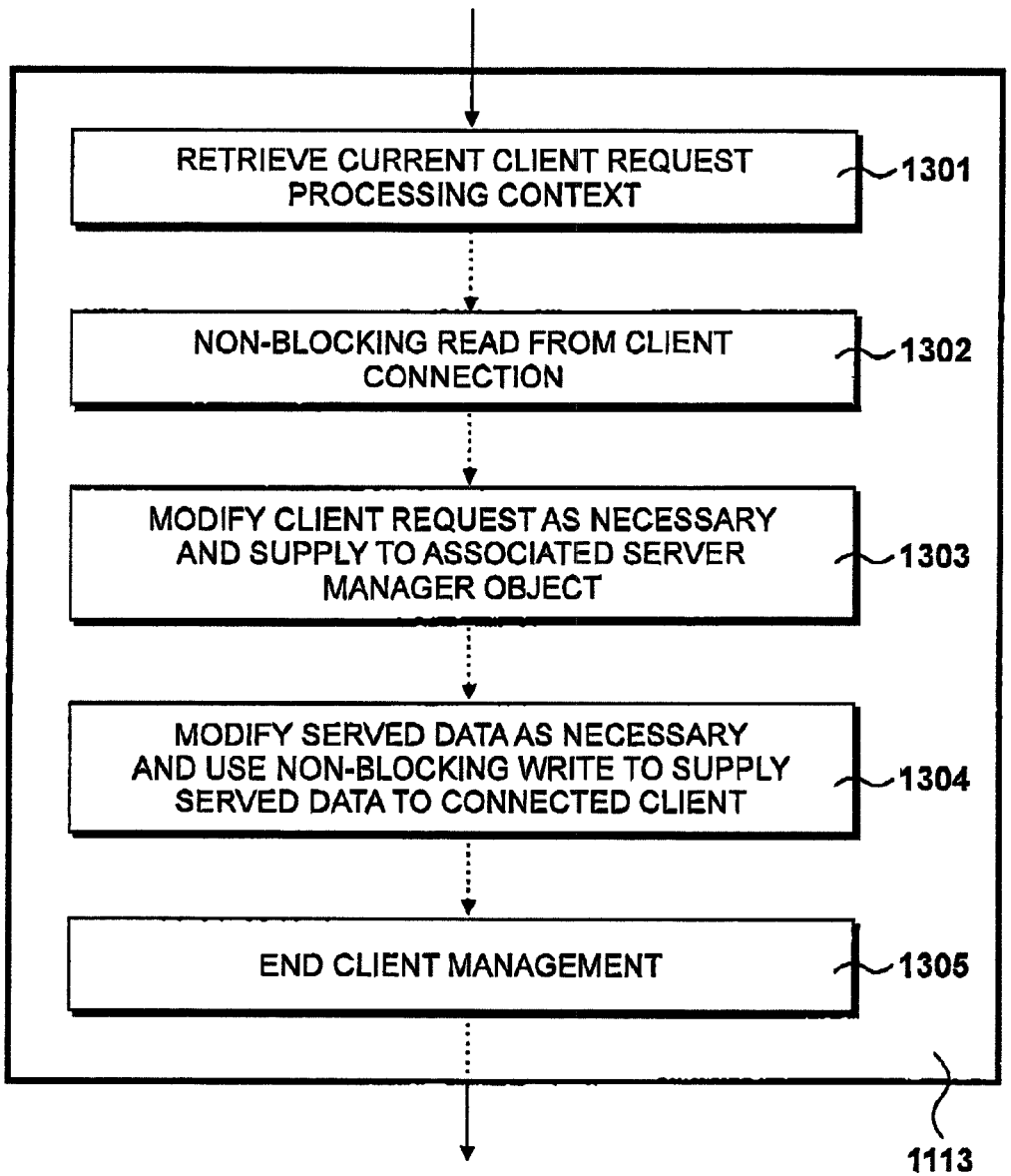
FIG. 13 details procedures for ongoing client request processing.

Step 1113 for ongoing client request processing is detailed in FIG. 13. Steps identified in FIG. 13 are not completed in a single iteration. Each time the process detailed in FIG. 13 is encountered, the current processing context is retrieved at step 1301 and processing may then be re-established at any of steps 1302 to 1305, effectively where it left off previously.

At step 1301 the current client request processing context is retrieved. The client request processing context is a pointer to any of steps 1302 to 1305 identifying a point where processing in a previous iteration of the steps terminated. Thus, after step 1301, processing is resumed at any of steps 1302 to 1305.

At step 1302 a non-blocking read operation is performed from the client connection so as to read as much data as is presently available on the client connection. At step 1303 a client request is modified as necessary and supplied to the associated server manager. At step 1304 server data is modified as necessary and supplied to the client. Served data is received from the associated server manager object and supplied to the connection client. At step 1305 the client management process ends.

FIG. 14

Figure 14:
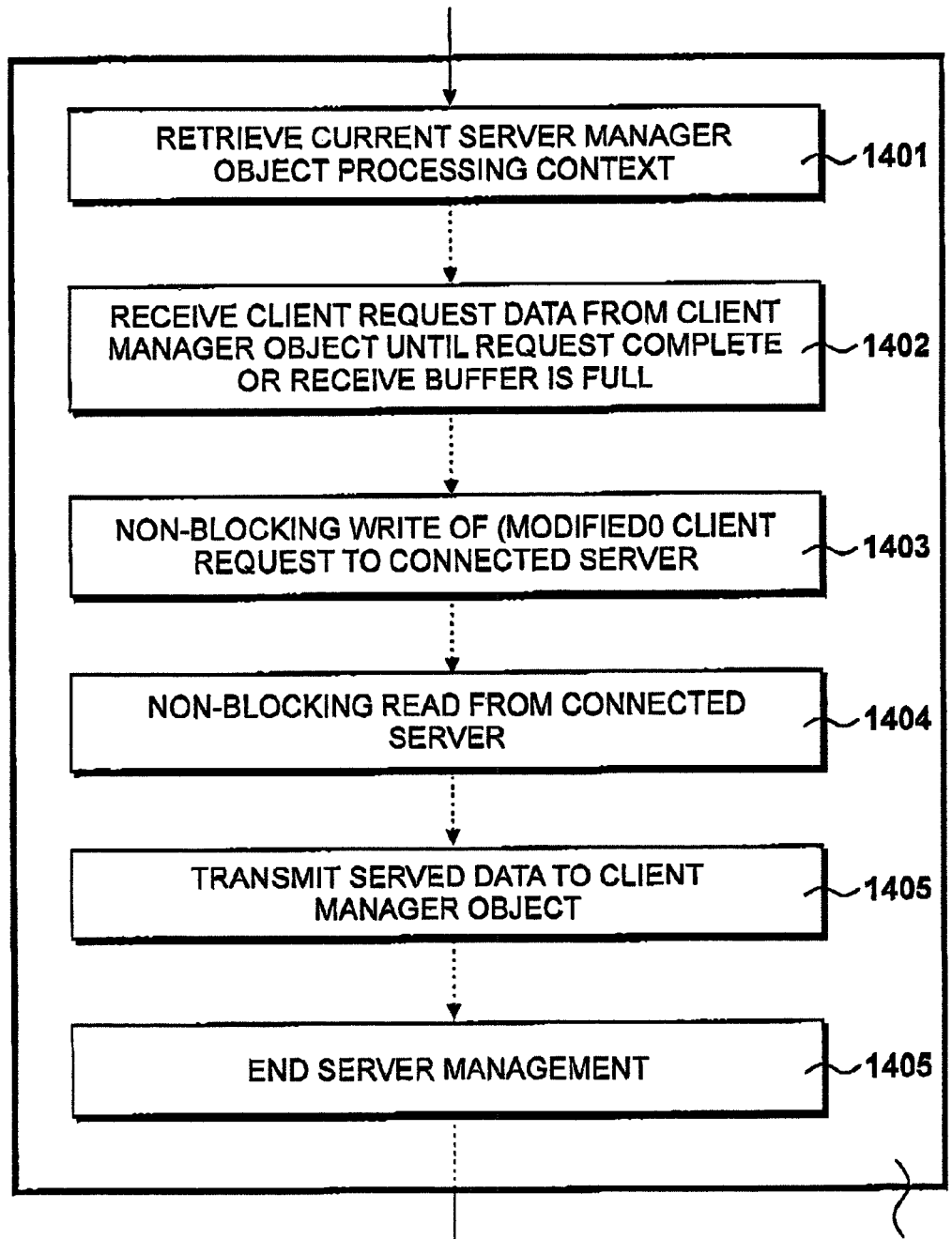
FIG. 14 shows server manager object processing.

Server manager object processing is detailed in FIG. 14. This represents the processing performed in response to the object created at step 1107 and again the steps are not completed in a single pass. Each time the processing is picked up, it continues after the point in steps 1402 to 1406 that it previously reached.

At step 1401 the current server object context is received, thereby resulting in the re-commencement of processing from one of steps 1402 to 1405.

At step 1402 client request data is received from the client manager object until the request has been completed or until the buffer is full. The client manager object is coupled with the server manager object it creates at step 1107. At step 1402 the server manager object picks up data (having been modified as necessary) from the client manager. It tries to get the full request so it can pass this on to the server. However, the request may not necessarily be complete or may be too long to fit in the buffer that is used to communicate between the client and server manager objects.

At step 1403 a non-blocking write is made to the server connection of the client request, possibly in modified form. Thus another non-blocking connection operation is provided, this time writing to the server connection.

At step 1404 a non-blocking read from the server connection is made, which is the point at which data is picked up from the server, ready to be supplied to the client. At step 1405 data is transmitted to the client manager object. The client and server managers communicate with each other. This time the server object supplies the data it has received from the server to the client manager object using internal memory buffers in main memory to facilitate this communication. At step 1406 the server management ends. Once the full request and cycle is over the server manager object is deleted and the connection it created is put in the server connection cache.

FIG. 15

Figure 15:
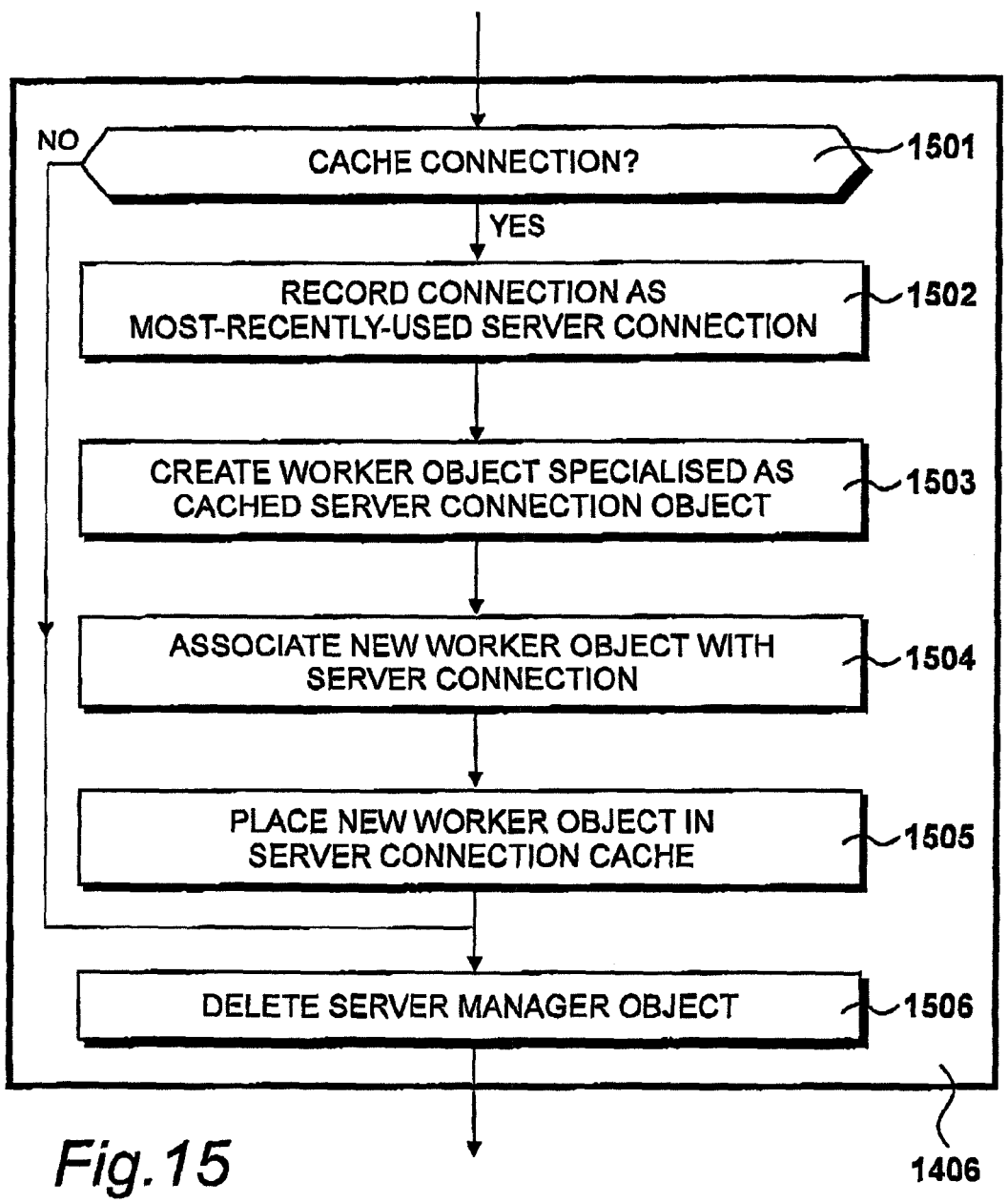
FIG. 15 shows procedures for ending server management.

Procedure 1406 for ending server management is detailed in FIG. 15. At step 1501 a question is asked as to whether the connection is to be cached. A possible reason why a traffic manager might decide not to cache a connection is because it has a lot of cache connections to a server with a small concurrency limit and caching more connections could result in other traffic managers being unable to access that server.

If the question is answered in the affirmative, the connection is recorded as the most recently used server connection. Server connections are reused in part according to the MRU cache policy and therefore it is necessary to note the recency of connections as they are placed in the cache. This can be achieved by the ordering of a linked list of cached objects.

At step 1503 a worker object is created that specialises as a cached server connection object. Cached server connections require maintenance and therefore each has its own specialised worker object.

At step 1504 the new worker object is associated with the server connection. Thus in the table of active connections 605 the object association is changed with the server connection from the server management object to the new cached server connection object. At step 1505 the new cached server connection object is placed in the server connection cache 718. Thereafter at step 1506 the server object is deleted.

FIG. 16

Figure 16:
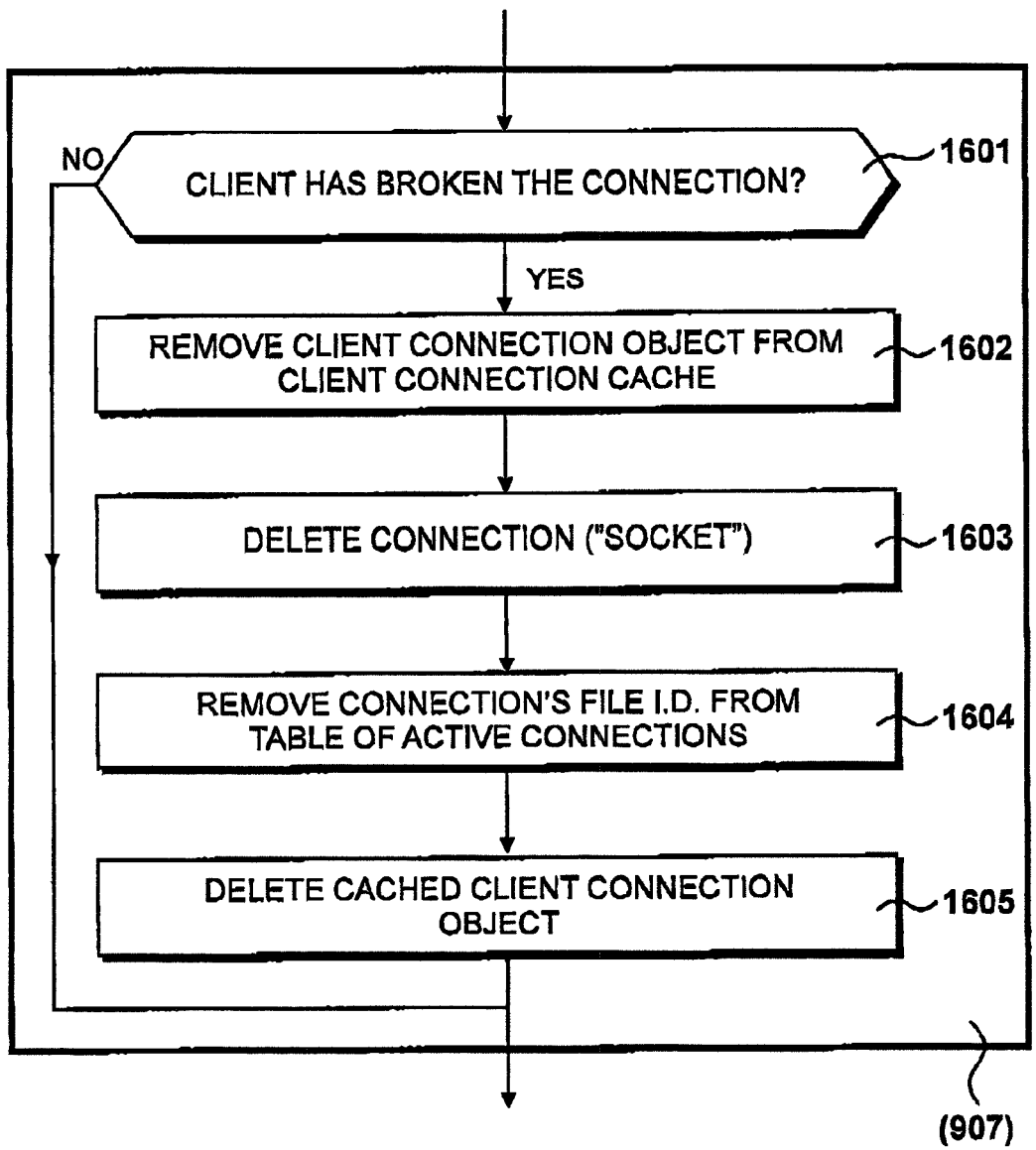
FIG. 16 details a worker object in the client connection cache.

A worker object 712 in the client connection cache, representing a client connection, is detailed in FIG. 16. Maintenance may be required on cache connections in situations where the client breaks the connection. Thus the procedure represents the object processing performed for a cached client connection.

At step 1601 a question is asked as to whether the client has broken the connection with the procedure terminating if the question is answered in the negative. If the question asked at step 1601 is answered in the affirmative, to the effect that the client has broken the connection, the client connection object is removed from the client connection cache at step 1602. At step 1603 a socket is deleted and at step 1604 the connection's row entry in the table of active connections is removed. Thereafter step 1605 the cache client connection object is deleted.

FIG. 17

Figure 17:
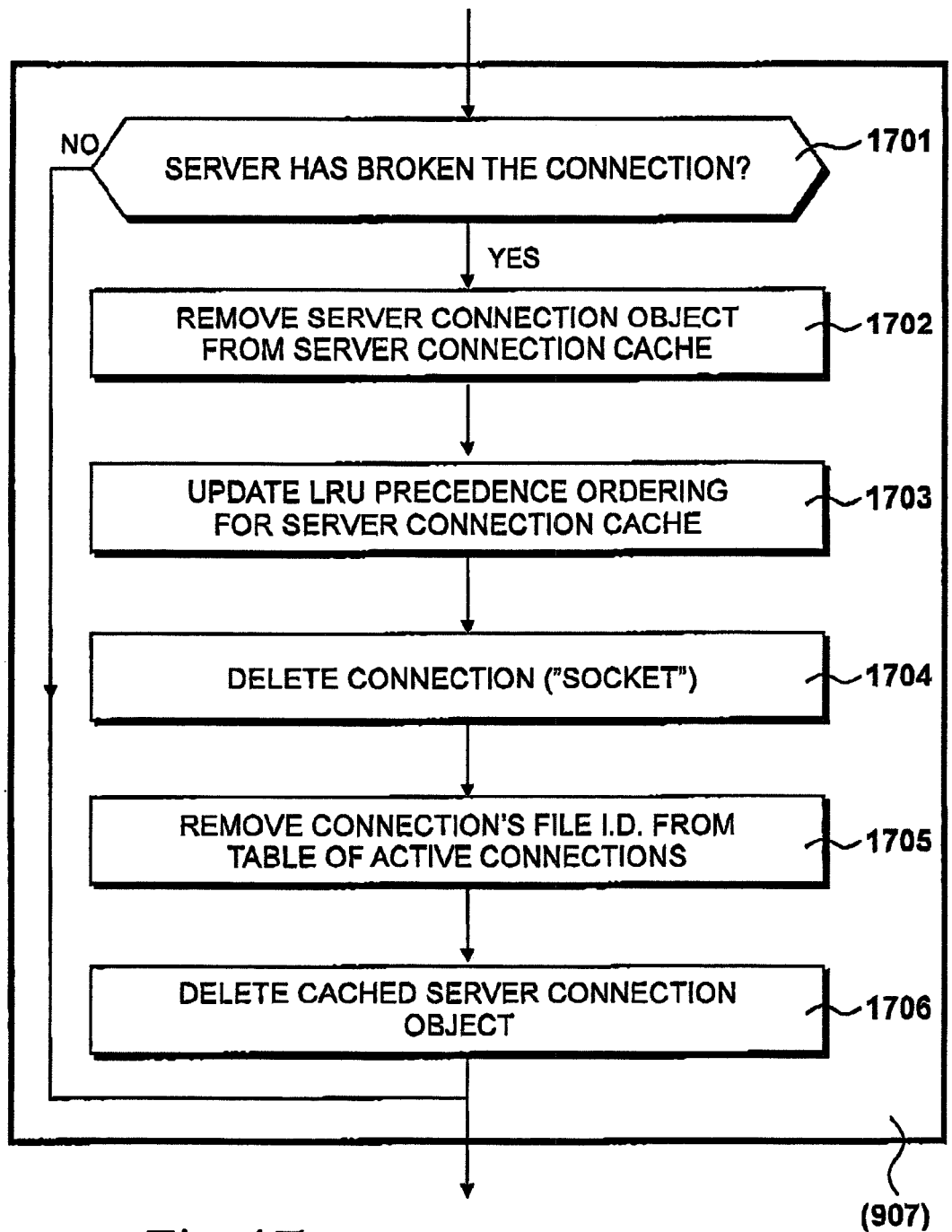
FIG. 17 shows the processing of a cached server connection.

The processing of cached server connection objects is detailed in FIG. 17. This is required because a server may also break a connection in which case the connection is not available and must be removed from the cache. At step 1701 a question is asked as to whether the server has broken the connection. If answered in the negative, the procedure is terminated. If the question asked at step 1701 is answered in the affirmative, the server connection object is removed from the server connection cache at step 1702.

At step 1703 the MRU precedence ordering for the server connection cache is updated. In this embodiment, the server connection cache preserves the recency ordering so that it knows which is the most recently used connection in each server pool. At step 1704 a socket is deleted and at step 1705 the connection's file entry ID is removed from the table of active connections. Thereafter, at step 1706 the cached server connection object is deleted.

FIG. 18

Figure 18:
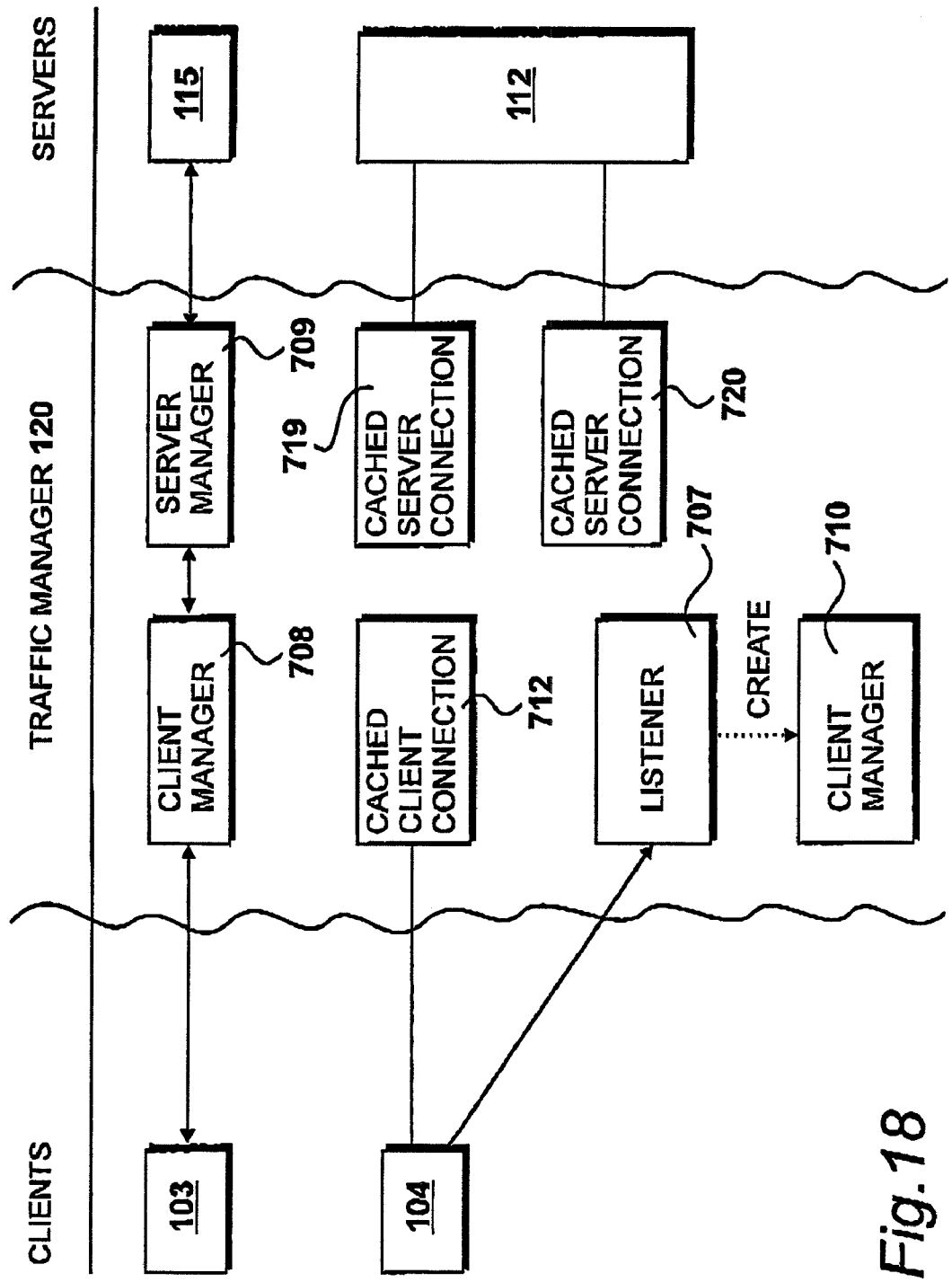
FIG. 18 shows a typical set of relationships of clients and servers.

A typical set of relationships of clients and servers along with objects facilitating their communication in the traffic manager is illustrated in FIG. 18. Thus, in this example, client 103 is communicating with server 115 by the operations performed by a client manager object 708 and server manager object 709.

Client 104 wishes to establish communication and its request is identified by listener object 707. This results in the creation of a client manager object 710. Client connection with client 104 has been cached as recorded at 712. Similarly, connections to server 112 have been established and are presently inactive as illustrated by their cached server objects 719 and 720.

The properties of worker objects have been described with reference to FIG. 7. In addition to performing these mainstream activities, it is also possible to add worker objects to assist with the handling of events, particularly if event handling is dealt with in a separate process. As such, time based events would be inserted into an execution queue and only executed at certain times.

In terms of providing information to external devices, such as mobile devices, a Java application could be included in order to distribute messages to mobile telephones for example.

The invention claimed is:

1. Apparatus for supplying web pages from servers to requesting clients over the Internet, comprising:
    a plurality of servers, each configured to supply web page data to a plurality of requesting clients;
    a traffic manager configured to receive request data from the requesting clients and to select one of said serving devices for serving web page data to the requesting client; and
    a data manipulation station configured to manipulate said request data or said web page data, wherein:
        said traffic manager supplies a function call to said data manipulation station that includes request data or web page data using internet protocol;
        said manipulation station manipulates at least on of said request data or said web page data to produce manipulated data, the produced manipulated data having reduced bandwidth demand; and
    said manipulation station returns said manipulated data to the traffic manager.

2. The apparatus of claim 1, wherein said manipulation station is configured to manipulate request data, a manipulated request is returned to said traffic manager, said traffic manager selects a server based on said manipulated request, and web page data is returned to the requesting client from the selected server.

3. The apparatus of claim 2, wherein said manipulating station has access to a database and the nature of the manipulation is dependent upon stored data read from said database wherein said database stores details of authorized users and said stored data confirms a requesting client is an authorized user.

4. The apparatus of claim 3, wherein said manipulated request identifies a request as authorized or not authorized.

5. The apparatus of claim 1, wherein the traffic manager tracks repeated requests for additional data and after a predetermined number of repeated requests the traffic manager anticipates the request for additional data and sends said additional data without said additional data being requested.

6. The apparatus of claim 1, wherein said manipulation station is configured to manipulate web page data, the traffic manager selects a server, the web page data is supplied from the selected server to the traffic manager, the traffic manager makes a call to the manipulation station with the web page data, the manipulation station manipulates the web page data, the manipulated web page data is returned to the traffic manager, and the traffic manager serves the manipulated web page data to the requesting client.

7. The apparatus of claim 6, wherein said manipulation station is configured to modify or delete specified textural matter.

8. The apparatus of claim 6, wherein said manipulation station is configured to modify page bandwidth.

9. A method of performing a traffic management function to facilitate the supply of web pages from servers to requesting clients over the Internet, comprising the step of:
    receiving request data from a browsing client to supply web page data to said browsing client from a server; comprising the steps of:

supplying a function call using internet protocol to a manipulating station configured to manipulate said request data;

receiving manipulated request data from said manipulating station using internet protocol in response to said function call;

using said manipulated request data to address a server, receiving web page data from said server in response to said manipulated request data, the received web page data having reduced bandwidth demand in response to the manipulated request data; and serving said received web page data to said browsing client.

10. The method of claim 9, wherein said manipulating station assesses whether a user of said browsing client is an authorized user by accessing a database.

11. The method of claim 9, wherein a request for additional information about a user or a browser is received from the manipulation station.

12. The method of claim 11, wherein request type frequencies are monitored to anticipate requests from the manipulation station.

13. The method of claim 9 further comprising modifying the request at a manipulation station independent from a proprietary environment of the server.

14. The method of claim 9 further comprising:
manipulating the request by the request data manipulator to generate the manipulated request data; and
sending the manipulated request data to the server for serving a retrieved web page responsive to the manipulated request data.

15. A method of performing a traffic management function to facilitate the supply of web pages from servers to requesting clients over the Internet, comprising the steps of:
receiving request data from a browsing client to supply web page data to said browsing client from a server;
requesting web page data from a selected server in response to said request data;
supplying a function call using internet protocol to a manipulating station configured to manipulate said web page data;
receiving manipulated web page data from said manipulating station using internet protocol in response to said function call, the manipulated web page data having a reduced bandwidth demand in response to said function call; and
serving said manipulated web page data to said browsing client.

16. The method of claim 15, wherein said manipulating station assess whether a user of said browsing client is an authorized user by accessing a database.

17. The method of claim 15, wherein a request for additional information about a user or a browser is received from the manipulation station.

18. The method of claim 15, wherein request type frequencies are monitored to anticipate requests from the manipulation station.

19. The method of claim 15 wherein the manipulated web page data is modified.

20. The method of claim 15 further comprising
manipulating the requested web page data by a page data manipulator based on the supplied function call to generate manipulated web page data; and
returning the manipulated web page data to the requesting client.

21. The method of claim 20 further comprising manipulating the retrieved web page data by modifying textual matter according to the supplied function call.

22. The method of claim 20 further comprising manipulating the retrieved web page data by reducing image resolution according to the supplied function call.

23. The method of claim 15 further comprising manipulating the retrieved web page data such that the manipulated web page data requires less bandwidth than the served web page data retrieved by the server.

* * * * *